United States Patent [19]
Hodges

[11] Patent Number: 5,221,064
[45] Date of Patent: Jun. 22, 1993

[54] HEIGHT ADJUSTABLE PIPE HANGER

[76] Inventor: B. Eugene Hodges, 761 Palmer Dr., Greenville, Mich. 48838

[21] Appl. No.: 798,816

[22] Filed: Nov. 27, 1991

[51] Int. Cl.⁵ .............................................. F16L 3/00
[52] U.S. Cl. ...................................... 248/59; 248/62; 248/74.3; 248/333; 403/108; 403/408.1
[58] Field of Search .................. 248/59, 62, 70, 74.3, 248/333, 188.5; 403/408.1, 108, 330, 376, 377, 378, 109

[56]   References Cited
U.S. PATENT DOCUMENTS

| | | | |
|---|---|---|---|
| 1,784,244 | 12/1930 | Morris | 248/59 X |
| 2,161,782 | 6/1939 | Flower | 248/59 |
| 3,273,837 | 9/1966 | Willert et al. | 248/59 |
| 3,913,876 | 10/1975 | McSherry | 248/74.3 |
| 3,933,377 | 1/1976 | Arrowood | 248/62 X |
| 4,127,252 | 11/1978 | Splawn | 248/333 |
| 4,458,385 | 7/1984 | Espinoza | 248/74.3 X |
| 4,577,837 | 3/1986 | Berg et al. | 248/408 X |
| 4,768,741 | 9/1988 | Logsdon | 248/62 |
| 5,040,751 | 8/1991 | Holub | 248/74.3 X |

Primary Examiner—David A. Scherbel
Assistant Examiner—Derek J. Berger
Attorney, Agent, or Firm—Bullwinkel Partners, Ltd.

[57]   ABSTRACT

A pipe hanger in which the height of a suspended pipe can be adjusted comprises a telescoping hanger rod having a first section and a second section which slides within the first section and a means for securing the two sections in a fixed relation to one another. The first section has at least one pair of diametrically opposed holes and the second section has sets of diametrically opposed holes running axially along its length. A pair of manually operable keys is pivotally attached to a ring which fits snugly around the first section. At one end of each key is a locking plunger which, when inserted into aligned holes in the two sections, maintains the two sections in a fixed relationship. The height of a suspended pipe can easily be adjusted by disengaging the plungers from the holes and sliding the second section of hanger rod within the first section until a new set of holes in the second section are aligned with the holes in the first section.

6 Claims, 1 Drawing Sheet

U.S. Patent
June 22, 1993
5,221,064
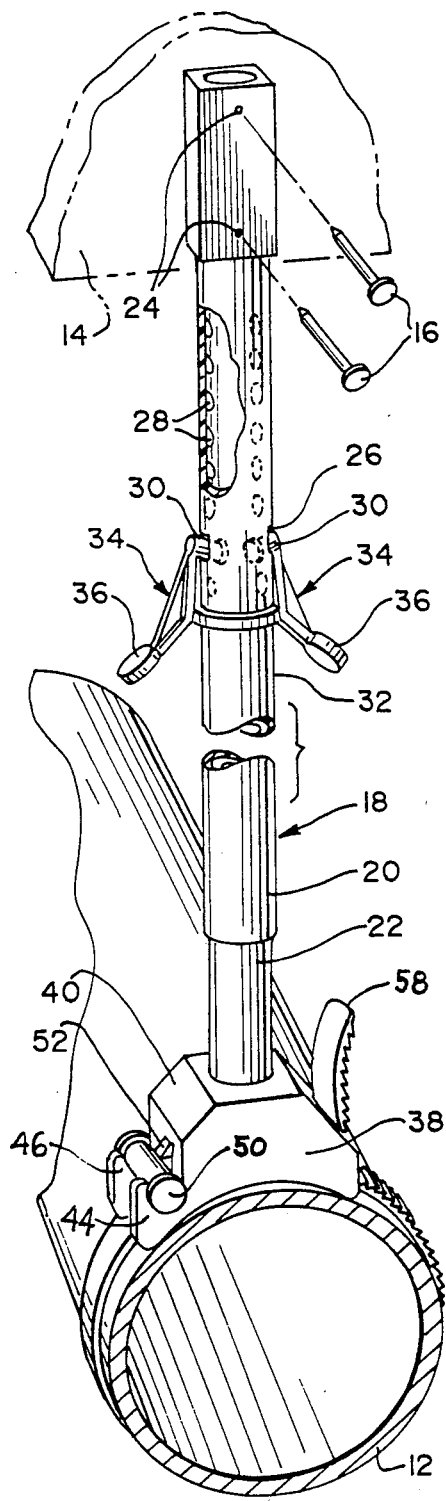
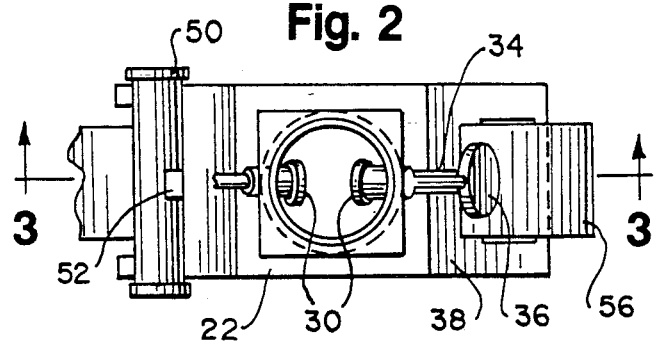
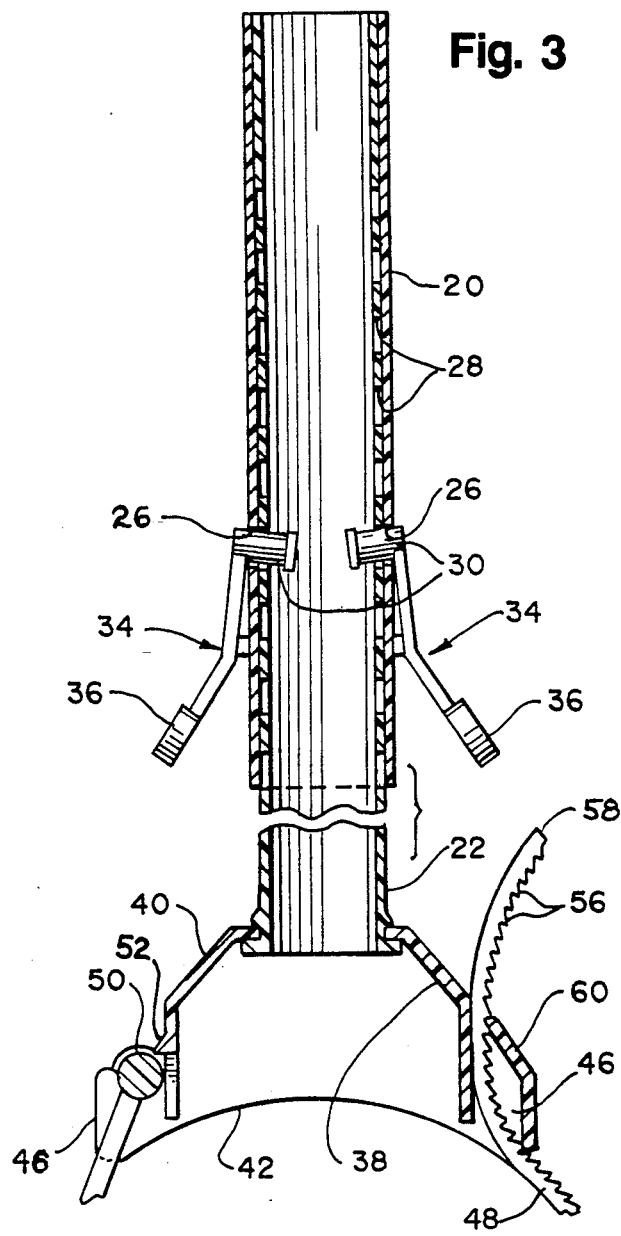

HEIGHT ADJUSTABLE PIPE HANGER

BACKGROUND OF THE INVENTION

In building construction, pipes or conduits and the like which run for any significant distance often must be suspended in a precise position from joints or other structural elements. This has been accomplished in the past by pipe hangers utilizing a vertical hanger rod terminating in a yoke, from which a strap or chain encircles the pipe and holds it snugly against the underside of the yoke. The hanger rod is then nailed or otherwise affixed to a joist or other structural element. Typical examples of such prior art pipe hangers are shown in Holub U.S. Pat. No. 5,040,751 and Logsdon U.S. Pat. No. 4,768,741.

It is often necessary for a plumber to selectively adjust the height of the suspended pipe relative to other structural elements, such as pipes or cables, or to provide a suitable slope or grade so that proper drainage can occur. A common problem with prior art pipe hangers is that they do not readily allow the height of the suspended pipe to be readily adjusted, either during installation, or afterwards. While with conventional pipe hangers the height of the suspended pipe can be adjusted to a certain extent by removing and then re-nailing the pipe hanger to the joist, this method of adjusting the height of the pipe has limitations. First, adjusting the height of the pipe requires the use of tools, typically a hammer or prybar, to remove the pipe hanger and then re-attach it to the joist. Secondly, the extent to which the height can be adjusted is limited to the vertical dimension of the joist.

SUMMARY OF THE INVENTION

It is a principal objective of the present invention to provide a simple, inexpensive pipe hanger in which the height of the suspended pipe can be quickly and easily adjusted over a wide range of movement. A related objective is to provide a pipe hanger having a telescoping hanger rod in which the height can be easily adjusted by a workman working alone, and without tools.

A further object is to provide a pipe hanger of this description which is capable of supporting pipes or conduits of various diameters.

A still further object is to provide such a pipe hanger in which the pipe can be quickly and easily strapped to the hanger.

Yet another object is to provide such a pipe hanger in which the pipe may be selectively positioned either parallel to or perpendicular with its supporting joist.

More particularly, an object of the invention is to provide such a hanger which can be rotated and then locked into position quickly and easily, thus accommodating pipes which run at various angles with respect to a joist.

THE DRAWINGS

FIG. 1 is a perspective view of the pipe hanger of the present invention, shown ready to attach by nailing to a joist or other structural element, and in partial cutaway view to better show the adjustable height positioning means;

FIG. 2 is a top view of the pipe hanger of FIG. 1;

FIG. 3 is a cross-section of the pipe hanger of FIG. 1 taken along line 3—3 of FIG. 2, showing the two sections of the telescoping hanger rod locked in a fixed relationship by two keys, according to the invention.

DETAILED DESCRIPTION OF THE INVENTION

Turning to the drawings, there is shown in FIG. 1 the preferred embodiment of the pipe hanger of the present invention. The hanger is used to suspend a pipe or conduit 12 at a fixed height from a joist or other structural element 14. Nails 16 secure the pipe hanger to the joist 14.

The pipe hanger comprises a telescoping hanger rod 18 having first and second sections 20, 22. The first section 20 has at its top end two pairs of holes 24 for receiving the nails 16 or other fastening means when the pipe hanger is secured to a joist. Near its bottom end, the first section 20 has a pair of diametrically opposed holes 26 which, when aligned with holes 28 in the second section 22, are adapted to receive locking plungers 30.

The second section 22 of the hanger rod 18 has an external diameter chosen to be slightly smaller than the internal diameter of the first section 20 so that the second section 22 can smoothly and easily telescope up and down within it.

According to the invention, a series of diametrically opposed holes 28 are located axially along the length of the second section 22 of the hanger rod 18. By sliding the second section 22 up or down within the first section 20, one of the sets of holes in the second section 22 is selectively aligned with the holes 26 in the first section 20 at a height corresponding to the desired final position of the pipe 12.

To lock the second section 22 of the hanger rod 18 in a fixed relationship with the first section 20, a novel means for securing the second section to the first section is provided. According to one aspect of the invention, this securing means comprises a ring 32 which fits snugly and slidably over the first section 20 of the hanger rod 18. Carried by the ring 32 in a flexibly pivotal manner are two diametrically opposed hand-operated keys 34. The ring 32 and keys 34 are preferably made by injection molding of a flexible plastic, such as ABS. Each key 34 comprises a locking plunger 30 at one end connected by a lever to a keypad 36 at its opposite end, and a region of flexible attachment at its midpoint which acts as a pivot point or fulcrum. The keys 34 are thereby flexibly biased toward an engaged position wherein each of the locking plungers 30 is urged into one of the corresponding holes 26.

In the engaged or locked position (shown in FIGS. 1, 2 and 3) the holes 26 in the first section 20 of the hanger rod 18 are aligned with a pair of holes in the second section 22 and the locking plungers 30 extend through the aligned holes. The locking plungers 30 can be easily and single-handedly disengaged by simply pressing with the fingers on the keypads 36, causing each key 34 to pivot about the point where the keys 34 are attached to the ring 32. In the disengaged position, the second section 22 of the hanger rod 18 slides freely up and down within the first section 20.

To hold the pipe 12, a yoke 38 is fixedly attached to the bottom end of the second section 22 of the hanger rod 18. As best shown in FIG. 3, the yoke 38 has a top side 40 and an arcuately-shaped bottom surface 42 on the side opposite the hanger rod 18. Two hooks 44, 46 extend from the top side 40 of the yoke 38 downward to the bottom surface 42. A strap 48 having an enlarged cylindrically-shaped head 50 at one end is hung over the hooks 44, 46 until the enlarged head 50 is securely seated. A retaining ridge 52 projects from the lateral surface of the yoke 38 just above the hooks 44, 46 to retain the enlarged head 50 of the strap 48.

The strap 48 comprises a series of adjacent ratchet teeth 56 displaced along one side of the strap 48 and extending toward the end of the strap 48 opposite the enlarged head 50. The end 58 of the strap 48 opposite the enlarged head 50 is inserted through the second slot 46 where one of the adjacent teeth is engaged by a ratchet tongue 60. The strap 48 can be adjusted to accommodate pipes of various diameters by pulling or pushing the strap 48 through the second slot 46.

In the preferred embodiment, the hanger rod 18, the yoke 38, and the securing means are formed of thermoplastic material such as polystyrene or ABS, although other materials may be used without departing from the scope of the invention.

In an alternative embodiment of the invention (not shown), the securing means comprises a nut and bolt. In this alternative embodiment, a nut is inserted through aligned holes in the first and second sections of the hanger rod 18 and a bolt is affixed to the end of the nut.

In another alternative embodiment of the invention (not shown) the yoke 38 is pivotally attached to the bottom of the second section 22 of the hanger rod 18. By pivoting the yoke 38 about the hanger rod 18, the pipe hanger can be used to suspend pipe from a joist where the pipe does not run parallel or perpendicular to the joist.

Other modifications and alternative embodiments of the invention are contemplated which do not depart from the spirit and scope of the invention as defined by the foregoing teachings and appended claims. For example, additional holes can be added to either of the two hanger rod sections which are offset from the holes in the illustrated embodiment. Such a configuration would allow the second section 22 of the hanger rod 18 to be rotated with respect to the first section 20 until a new alignment of holes is achieved, again enabling the pipe hanger to accommodate pipe that does not run parallel or perpendicular to the joist.

I claim as my invention:

1. A pipe hanger adapted to accommodate pipes of various diameters and to hold said pipe in a height adjustable position by suspending said pipe from a joist or other structural element, said pipe hanger comprising:

a telescoping hanger rod comprising a first section having a top end and a bottom end and having near its bottom end a first pair of diametrically opposed holes, a second section having a top end slidably received within said first section and having at least two sets of second pairs of diametrically opposed holes disposed axially along the length of the second section in cooperation with said first pair of holes;

securing means comprising a ring slidably mounted on said first section of hanger rod and two keys pivotally secured to said ring, each of said keys comprising a locking plunger at one end and a keypad at the other end with a fixed fulcrum between the keypad and the locking plunger, wherein in the locked position said holes in said first section of hanger rod are aligned with one set of said holes in said second section and said locking plungers extend through said aligned holes, and wherein said locking plungers can be disengaged from said holes by pressing said keypads; said ring, keys, locking plungers and keypads being integrally formed of thermoplastic material such that the keys are flexibly biased in the locked position;

a yoke attached to said bottom end of said second section of said hanger rod, said yoke having an arcuately-shaped bottom surface with a first slot on one end of said surface and a second slot on the opposite end; and a flexible hanger strap having at one end an enlarged substantially cylindrical head adapted to be received and secured within said first slot and gripping means for adjustably securing the opposite end of said strap within said second slot.

2. The pipe hanger of claim 1 in which said gripping means comprises a series of adjacent ratchet teeth displaced along one side of said strap, and in which said yoke further comprises a ratchet tongue for securing said opposite end of strap in said second slot.

3. The pipe hanger of claim 2 in which said yoke further comprises means for securing said enlarged head of said strap within said first slot.

4. The pipe hanger of claim 3 in which the yoke is fixedly attached to said bottom end of said second section of said hanger rod.

5. The pipe hanger of claim 4 in which the hanger rod, means for securing said hanger rod second section to said hanger rod first section, and yoke are formed of thermoplastic material.

6. The pipe hanger of claim 3 in which the yoke is pivotally attached to said bottom end of said second section of said hanger rod.

* * * * *